United States Patent
Asay et al.

(10) Patent No.: US 10,294,375 B2
(45) Date of Patent: May 21, 2019

(54) ELECTRICALLY CONDUCTIVE COATINGS CONTAINING GRAPHENIC CARBON PARTICLES

(71) Applicant: PPG Industries Ohio, Inc., Cleveland, OH (US)

(72) Inventors: David B. Asay, Sarver, PA (US); Noel R. Vanier, Wexford, PA (US); Cheng-Hung Hung, Wexford, PA (US); Eldon L. Decker, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 481 days.

(21) Appl. No.: 14/432,129

(22) PCT Filed: Sep. 27, 2013

(86) PCT No.: PCT/US2013/062306
§ 371 (c)(1),
(2) Date: Mar. 27, 2015

(87) PCT Pub. No.: WO2014/070346
PCT Pub. Date: May 8, 2014

(65) Prior Publication Data
US 2015/0240088 A1    Aug. 27, 2015

Related U.S. Application Data

(63) Continuation-in-part of application No. PCT/US2012/057811, filed on Sep. 28, 2012, which
(Continued)

(51) Int. Cl.
*B32B 27/32* (2006.01)
*C09D 5/24* (2006.01)
(Continued)

(52) U.S. Cl.
CPC ............. *C09D 5/24* (2013.01); *C09D 7/1291* (2013.01); *C09D 7/70* (2018.01); *C08K 3/04* (2013.01);
(Continued)

(58) Field of Classification Search
CPC .......... C09D 5/24; C09D 7/1291; C08K 3/04; C08K 2201/001; C08K 2201/006
See application file for complete search history.

(56) References Cited

U.S. PATENT DOCUMENTS

4,851,262 A    7/1989    McFeaters
5,114,477 A    5/1992    Mort et al.
(Continued)

FOREIGN PATENT DOCUMENTS

CN    101974266 A    2/2011
CN    102683034 A    9/2012
(Continued)

OTHER PUBLICATIONS

KR 20120029530 A_Machine Translation.*
(Continued)

*Primary Examiner* — Travis M Figg
(74) *Attorney, Agent, or Firm* — Alan G. Towner (57) ABSTRACT

Coating compositions containing graphenic carbon particles are disclosed. The graphenic carbon particles may be thermally produced and dispersed in thermoset and/or thermoset polymeric film coatings. The cured coatings exhibit desirable properties such as increased electrical conductivity.

22 Claims, 2 Drawing Sheets

Related U.S. Application Data is a continuation-in-part of application No. 13/309,894, filed on Dec. 2, 2011, now Pat. No. 8,486,364, which is a continuation-in-part of application No. 13/249,315, filed on Sep. 30, 2011, now Pat. No. 8,486,363.

(60) Provisional application No. 61/794,586, filed on Mar. 15, 2013.

(51) Int. Cl.
  *C09D 7/40* (2018.01)
  *C09D 7/12* (2006.01)
  *C08K 3/04* (2006.01)

(52) U.S. Cl.
  CPC .. *C08K 2201/001* (2013.01); *C08K 2201/006* (2013.01)

(56) References Cited

U.S. PATENT DOCUMENTS

| | | | |
|---|---|---|---|
| 5,486,675 A | 1/1996 | Taylor et al. | |
| 5,527,518 A | 6/1996 | Lynum et al. | |
| 5,749,937 A | 5/1998 | Detering et al. | |
| 5,763,548 A | 6/1998 | Matyjaszewski et al. | |
| 5,788,738 A | 8/1998 | Pirzada et al. | |
| 5,789,487 A | 8/1998 | Matyjaszewski et al. | |
| 5,807,937 A | 9/1998 | Matyjaszewski et al. | |
| 5,851,507 A | 12/1998 | Pirzada et al. | |
| 5,935,293 A | 8/1999 | Detering et al. | |
| 5,984,997 A | 11/1999 | Bickmore et al. | |
| 5,989,648 A | 11/1999 | Phillips | |
| 6,099,696 A * | 8/2000 | Schwob | B01J 19/088 204/173 |
| 6,228,904 B1 | 5/2001 | Yadav et al. | |
| 6,316,119 B1 | 11/2001 | Metzger et al. | |
| 6,358,375 B1 | 3/2002 | Schwob | |
| 6,441,066 B1 | 8/2002 | Woodworth et al. | |
| RE37,853 E | 9/2002 | Detering et al. | |
| 6,642,301 B2 | 11/2003 | White et al. | |
| 6,652,967 B2 | 11/2003 | Yadav et al. | |
| 6,669,823 B1 | 12/2003 | Sarkas et al. | |
| 6,689,192 B1 | 2/2004 | Phillips et al. | |
| 6,710,116 B1 | 3/2004 | Waddell et al. | |
| 6,716,525 B1 | 4/2004 | Yadav et al. | |
| 6,719,821 B2 | 4/2004 | Yadav et al. | |
| 6,786,950 B2 | 9/2004 | Yadav et al. | |
| 6,821,500 B2 | 11/2004 | Fincke et al. | |
| 6,830,822 B2 | 12/2004 | Yadav | |
| 6,849,109 B2 | 2/2005 | Yadav et al. | |
| 7,071,258 B1 | 7/2006 | Jang et al. | |
| 7,508,650 B1 | 3/2009 | Bluvstein et al. | |
| 7,623,340 B1 | 11/2009 | Song et al. | |
| 7,632,538 B2 | 12/2009 | Veerasamy | |
| 7,635,458 B1 | 12/2009 | Hung et al. | |
| 7,754,184 B2 | 7/2010 | Mercuri | |
| 7,776,303 B2 | 8/2010 | Hung et al. | |
| 7,785,492 B1 | 8/2010 | Jang et al. | |
| 7,790,285 B2 | 9/2010 | Zhamu et al. | |
| 7,824,741 B2 | 11/2010 | Sandhu | |
| 7,842,271 B2 | 11/2010 | Petrik | |
| 7,852,613 B2 | 12/2010 | Ma et al. | |
| 7,948,739 B2 | 5/2011 | Zhamu et al. | |
| 8,047,248 B2 | 11/2011 | Prud'homme et al. | |
| 8,048,950 B2 | 11/2011 | Prud'homme et al. | |
| 8,083,970 B2 | 12/2011 | Ma et al. | |
| 8,129,466 B2 | 3/2012 | Polk et al. | |
| 8,211,601 B2 | 7/2012 | Yu et al. | |
| 8,486,363 B2 | 7/2013 | Hung et al. | |
| 8,486,364 B2 | 7/2013 | Vanier et al. | |
| 8,691,441 B2 | 4/2014 | Zhamu et al. | |
| 2002/0114949 A1 | 8/2002 | Bower et al. | |
| 2003/0032716 A1 | 2/2003 | White et al. | |
| 2004/0247515 A1 | 12/2004 | Gardner | |
| 2005/0143327 A1 | 6/2005 | Hirsch | |
| 2005/0271574 A1 | 12/2005 | Jang et al. | |
| 2006/0093885 A1 | 5/2006 | Krusic et al. | |
| 2006/0121279 A1 | 6/2006 | Petrik | |
| 2006/0216222 A1 | 9/2006 | Jang | |
| 2006/0225615 A1 | 10/2006 | Ramen et al. | |
| 2007/0045116 A1 | 3/2007 | Hung et al. | |
| 2007/0096066 A1 | 5/2007 | Yoshida et al. | |
| 2007/0237705 A1 | 10/2007 | Itoh et al. | |
| 2007/0258189 A1 | 11/2007 | Tano et al. | |
| 2008/0089013 A1 | 4/2008 | Zhong et al. | |
| 2008/0149900 A1 | 6/2008 | Jang et al. | |
| 2008/0206124 A1 | 8/2008 | Jang et al. | |
| 2008/0220176 A1 * | 9/2008 | Carlblom | C08F 2/22 427/445 |
| 2009/0022649 A1 | 1/2009 | Zhamu et al. | |
| 2009/0054581 A1 | 2/2009 | Prud'homme et al. | |
| 2009/0061194 A1 | 3/2009 | Green et al. | |
| 2009/0068471 A1 | 3/2009 | Choi et al. | |
| 2009/0075035 A1 | 3/2009 | O'Brien et al. | |
| 2009/0104427 A1 | 4/2009 | Wan et al. | |
| 2009/0110627 A1 | 4/2009 | Choi et al. | |
| 2009/0117467 A1 | 5/2009 | Zhamu et al. | |
| 2009/0169467 A1 | 7/2009 | Zhamu et al. | |
| 2010/0000441 A1 | 1/2010 | Jang et al. | |
| 2010/0036023 A1 | 2/2010 | Weng et al. | |
| 2010/0047154 A1 | 2/2010 | Lee et al. | |
| 2010/0055017 A1 | 3/2010 | Vanier et al. | |
| 2010/0055025 A1 | 3/2010 | Jang et al. | |
| 2010/0072430 A1 | 3/2010 | Gergely et al. | |
| 2010/0096597 A1 | 4/2010 | Prud'homme et al. | |
| 2010/0126660 A1 | 5/2010 | O'Hara | |
| 2010/0143798 A1 | 6/2010 | Zhamu et al. | |
| 2010/0247801 A1 | 9/2010 | Zenasni | |
| 2010/0255219 A1 | 10/2010 | Wenxu et al. | |
| 2010/0301212 A1 | 12/2010 | Dato et al. | |
| 2010/0303706 A1 | 12/2010 | Wallace et al. | |
| 2010/0314788 A1 | 12/2010 | Hung et al. | |
| 2010/0323113 A1 | 12/2010 | Ramappa et al. | |
| 2011/0046289 A1 | 2/2011 | Zhamu et al. | |
| 2011/0070426 A1 | 3/2011 | Vanier et al. | |
| 2011/0086206 A1 * | 4/2011 | Scheffer | C09D 7/63 428/195.1 |
| 2011/0088931 A1 * | 4/2011 | Lettow | B82Y 30/00 174/257 |
| 2011/0186786 A1 * | 8/2011 | Scheffer | H01B 1/24 252/510 |
| 2011/0292570 A1 * | 12/2011 | Ivanovici | B82Y 30/00 361/502 |
| 2012/0021160 A1 | 1/2012 | Kariyada | |
| 2012/0026643 A1 * | 2/2012 | Yu | H01G 11/02 361/502 |
| 2012/0064409 A1 | 3/2012 | Zhamu et al. | |
| 2012/0068160 A1 | 3/2012 | Yamazaki et al. | |
| 2012/0128570 A1 | 5/2012 | Krishnaiah et al. | |
| 2012/0129980 A1 * | 5/2012 | Desai | B82Y 30/00 523/468 |
| 2012/0142832 A1 | 6/2012 | Varma et al. | |
| 2012/0181487 A1 | 7/2012 | Gibon et al. | |
| 2012/0211160 A1 * | 8/2012 | Asay | B82Y 30/00 156/324 |
| 2012/0277360 A1 * | 11/2012 | Scheffer | C08K 3/04 524/237 |
| 2012/0328953 A1 | 12/2012 | Hirohashi et al. | |
| 2013/0070390 A1 | 3/2013 | Lee et al. | |
| 2013/0084236 A1 * | 4/2013 | Hung | B82Y 40/00 423/448 |
| 2013/0084237 A1 * | 4/2013 | Vanier | B82Y 40/00 423/448 |
| 2013/0119321 A1 | 5/2013 | Lettow | |
| 2013/0171502 A1 | 7/2013 | Chen et al. | |
| 2013/0197158 A1 | 8/2013 | Kim et al. | |
| 2013/0207294 A1 | 8/2013 | Jeon et al. | |
| 2014/0042989 A1 | 2/2014 | Gogotsi et al. | |
| 2014/0057165 A1 | 2/2014 | Yamakaji et al. | |
| 2014/0212760 A1 | 7/2014 | Zhao et al. | |

(56) References Cited

U.S. PATENT DOCUMENTS

| | | | |
|---|---|---|---|
| 2014/0248214 A1 | 9/2014 | Hersam et al. | |
| 2014/0272591 A1 | 9/2014 | Vanier et al. | |
| 2014/0275409 A1 | 9/2014 | Bendiksen et al. | |

FOREIGN PATENT DOCUMENTS

| | | | | |
|---|---|---|---|---|
| CN | 102877109 A | 1/2013 | | |
| CN | 103468057 A | 12/2013 | | |
| CN | 103956275 A | 7/2014 | | |
| DE | 10 2011 003 619 A1 | 8/2012 | | |
| EP | 0281644 A1 | 9/1988 | | |
| EP | 1513026 A2 | 3/2005 | | |
| EP | 2562766 A1 | 2/2013 | | |
| GB | 1470617 A | 4/1977 | | |
| GB | 2483373 A | 3/2012 | | |
| JP | 2004325698 A | 11/2004 | | |
| JP | 2007012424 A | 1/2007 | | |
| JP | 2014007141 A | 1/2014 | | |
| KR | 20110089835 A | 8/2011 | | |
| KR | 20120029530 A | * | 3/2012 | G02B 1/111 |
| KR | 20130013689 A | 2/2013 | | |
| KR | 101243296 B1 | 3/2013 | | |
| RU | 2 160 750 C2 | 12/2000 | | |
| RU | 2315794 C1 | 1/2008 | | |
| WO | 9840415 A1 | 9/1998 | | |
| WO | 2005093872 A1 | 10/2005 | | |
| WO | 2008/045778 A1 | 4/2008 | | |
| WO | 2009099707 A1 | 8/2009 | | |
| WO | 2009123771 A3 | 8/2009 | | |
| WO | 2009/106507 A2 | 9/2009 | | |
| WO | 2009134492 A2 | 11/2009 | | |
| WO | 2010/016976 A1 | 2/2010 | | |
| WO | 2010072592 A1 | 7/2010 | | |
| WO | 2010107769 A2 | 9/2010 | | |
| WO | 2011012874 A1 | 2/2011 | | |
| WO | 2011084817 A1 | 7/2011 | | |
| WO | 2011086391 A1 | 7/2011 | | |
| WO | 2013049498 A1 | 4/2013 | | |
| WO | 2013165677 A1 | 11/2013 | | |
| WO | 2013166414 A2 | 11/2013 | | |
| WO | 2013192180 A2 | 12/2013 | | |
| WO | 2014070346 A1 | 5/2014 | | |
| WO | 2015089026 A1 | 6/2015 | | |

OTHER PUBLICATIONS

Espacenet English abstract of DE 10 2011 003 619 A1.
Espacenet English abstract of RU 2 160 750 C2.
Soldano, C, et al., "Production properties and potential of graphene", Carbon, 2010, vol. 48, pp. 1-57.
Bergeron "Production of Carbon by Prolysis of Methane in Thermal Plasma", Master's Thesis is Applied Sciences, University of Sherbrooke, Faculty of Applied Sciences, Department of Chemical Enginering, Quebec, Canada, Oct. 1997.
Brunaeur et al., "Adsorption of Gases in Multimolecular Layers", Journal of the American Chemical Society, 1938, vol. 60, pp. 309-313.
Cassagneau et al., "Preparation of Layer-by-Layer Self-Assembly of Silver Nanoparticles Capped by Graphite Oxide Nanosheets", J. Phys. Chem. B 1999, 103, 1789-1793.
Chen et al., "Oxidation Rsistance of Graphene-Coated Cu and Cu/Ni Alloy", ACS Nano, Jan. 28, 2011, pp. 1321-1327.
Choi et al., "Fabrication of Free-Standing Multilayered Graphene and Poly(3,4-ethylenedioxythiophene) Composite Films with Enhanced Conductive and Mechanical Properties", Langmuir, 26 (15), 2010, pp. 12902-12908.
Coraux, "Growth of Graphene on Ir(111)", New Journal of Physics 11, 2009, 023006, pp. 1-22.
Dato et al., "Substrate-Free Gas-Phase Synthesis of Graphene Sheets", Nano Letters, vol. 8, No. 7, 2008, pp. 2012-2016.
Dresselhaus et al., "Science of Fullerenes and Carbon Nanotubes", Academic Press, Inc., 1996, pp. 60-79.
Du et al., "Facile Synthesis of Highly Conductive Polyaniline/Graphite Nanocomposites", European Polymer Journal 40, 2000, pp. 1489-1493.
Fincke et al., "Plasma Pyrolysis of Methane to Hydrogen and Carbon Black", Ind. Eng. Chem. Res., 2002, pp. 1425-1435.
Fitzer et al., "Recommended Terminology for the Description of Carbon as a Solid", International Union of Pure and Applied Chemistry, Inorganic Chemistry Division, Pure & Applied Chemistry, vol. 67, No. 3, 1995, pp. 473-506.
Gannon, "Acetylene from Hydrocarbons", Kirk-Othmer Encyclopedia of Chemical Technology, 2003, pp. 1-28.
Gomez De Arco et al., "Synthesis, Transfer, and Devices of Single- and Few-Layer Graphene by Chemical Vapor Deposition", IEEE Transactions on Nanotechnology, vol. 8, No. 2, Mar. 2009, pp. 135-138.
Gonzalez-Aguilar et al., "Carbon Nanstructures Production by Gas-Phase Plasma Processes at Atmospheric Pressure", J. Phys. D: Appl. Phys. 40, 2007, pp. 2361-2374.
Holmen et al., "High-Temperature Pyrolysis of Hydrocarbons. 1. Methane to Acetylene", The Norwegian Institute of Technology, University of Trondheim, Ind. Eng. Chem., Process Des. Dev., vol. 15, No. 3, 1976.
Ji et al., "Graphene/Si Multilayer Structure Anodes for Advanced Half and Full Lithium-Ion Cells", Nano Energy, 2011.
Khan et al., "Survey of Recent Methane Pyrolysis Literature", Industrial and Engineering Chemistry, vol. 62, No. 10, Oct. 1970.
Kim et al., "Fabrication of Graphene Flakes Composed of Multi-Layer Graphene Sheets using a Thermal Plasma Jet System", Nanotechnology 21, Jan. 29, 2010.
Kim et al., "Continuous Synthesis of Nanostructured Sheetlike Carbons by Thermal Plasma Decomposition of Methane", IEEE Transactions on Plasma Science, vol. 35, No. 2, Apr. 2007.
Kostic et al., "Thermodynamic Consideration of B—O—C—H System for Boron Carbide (B4C) Powder Synthesis in Thermal Plasma", Progress in Plasma Processing of Materials, 1997, pp. 889-898.
Lavoie, "Synthesis of Carbon Black from Propane Using a Thermal Plasma", Master's Thesis in Applied Sciences, University of Sherbrooke, Faculty of Applied Sciences, Department of Chemical Engineering, Quebec, Canada, Sep. 1997.
Malesevic et al., "Synthesis of Few-Layer Graphene via Microwave Plasma-Enhanced Chemical Vapour Deposition", Nanotechnology 2008, vol. 19, No. 30, 305604 (6 pps).
Martin-Gallego et al., "Epoxy-Graphene UV-Cured Nanocomposites", Polymer, vol. 52, 2011, pp. 4664-4669.
McWilliams, "Graphene: Technologies, Applications, and Markets", BCC Research Report , Feb. 2011.
Nandamuri et al., "Chemical Vapor Deposition of Graphene Films", Nanotechnology 21, 2010, 145604 (4 pp.).
Prasai et al., "Graphene: Corrosion-Inhibiting Coating", ACS Nano, 6 (2), 2012, pp. 1102-1108.
Pristavita et al., "Carbon Blacks Produced by Thermal Plasma: the Influence of the Reactor Geometry on the Product Morphology", Plasma Chem. Plasma Process, 30, 2010, pp. 267-279.
Pristavita et al., "Carbon Nanoparticle Production by Inductively Coupled Thermal Plasmas: Controlling the Thermal History of Particle Nucleation", Plasma Chem. Plasma Process, 31, 2011, pp. 851-866.
Pristavita et al., "Carbon Nano-Flakes Produced by an Inductively Coupled Thermal Plasma System for Catalyst Applications", Plasma Chem. Plasma Process, 31, 2011, pp. 393-403.
Rafiee et al., "Enhanced Mechanical Properties of Nanocomposites at Low Graphene Content", ACSNANO, vol. 3, No. 12, 2009.
Skinner, "Prolysis of Methane and the C2 Hydrocarbons", Monsanto Chemical Co., Research and Engineering Division, Dayton 7, Ohio, pp. 59-68.
Su et al., "Could Graphene Construct an Effective Conducting Network in a High-Power Lithium Ion Battery?", Nano Energy, Feb. 25, 2012.
Su et al., "Flexible and Planar Graphene Conductive Additives for Lithium-Ion Batteries", J. Mater. Chem., 20, 2010, pp. 9644-9650.

(56) References Cited

OTHER PUBLICATIONS

Subrahmanyam et al., "Simple Method of Preparing Graphene Flakes by an ARC-Discharge Method", The Journal of Physical Chemistry C, vol. 113, No. 11, 2009, pp. 4257-4259.
Tang et al., Processible Nanostructured Materials with Electrical Conductivity and Magnetic Susceptibility: Preparation and Properties of Maghemite/Polyaniline Nanocomposite Films, Chem. Mater., 1999, 11, 1581-1589.
Verdejo et al, "Functionalized graphene sheet filled silicone foam nanocomposites", Journal of Materials Chemistry, Mar. 19, 2008, The Royal Society of Chemistry, vol. 18, pp. 2221-2226.
Yun et al., "Thermal Conductivity and Interconnectivity of Hexamethylene Diisocynate Contained Polyerethane Grafted Multiwall Carbon Nanotube/Polyurethane Nanocomposite Film", Materials Tranasactions, Jan. 26, 2011, The Japan Institute of Metals, vol. 52, No. 3, pp. 564-567.
Zhong et al., "Catalytic Growth of Carbon Nanoballs With and Without Cobalt Encapsulation", Cemical Physics Letters 330, 2000, pp. 41-47.
Thomas Swan Advanced Materials, "Elicarb® Graphene Powder and Elicarb® Graphene Dispersion (AQ)", 2014, 2 pages.
XG Sciences, The Material Difference, "xGnP® Graphene Nanoplatelets: A unique carbon nonomaterial with multifunctional properties", 2013, 3 pages.

* cited by examiner

FIG. 2

ELECTRICALLY CONDUCTIVE COATINGS CONTAINING GRAPHENIC CARBON PARTICLES

CROSS REFERENCE TO RELATED APPLICATIONS

This application is a 371 national stage entry of PCT/US2013/062306, filed Sep. 27, 2013, which is a continuation-in-part of PCT/US2012/057811 filed Sep. 28, 2012, which is a continuation-in-part of U.S. patent application Ser. No. 13/249,315 filed Sep. 30, 2011, now U.S. Pat. No. 8,486,363 issued Jul. 16, 2013, and is also a continuation-in-part of U.S. patent application Ser. No. 13/309,894 filed Dec. 2, 2011, now U.S. Pat. No. 8,486,364 issued Jul. 16, 2013. PCT/US2013/062306 also claims the benefit of U.S. Provisional Application No. 61/794,586, filed Mar. 15, 2013. U.S. patent application Ser. No. 13/309,894 filed Dec. 2, 2011, now U.S. Pat. No. 8,486,364 issued Jul. 16, 2013, is a continuation-in-part of U.S. patent application Ser. No. 13/249,315 filed Sep. 30, 2011, now U.S. Pat. No. 8,486,363 issued Jul. 16, 2013.

FIELD OF THE INVENTION

The present invention relates to electrically conductive coatings containing graphenic carbon particles.

BACKGROUND OF THE INVENTION

Many different types of coatings are subjected to environments where electrical conductivity is desired. For example, improved conductivity properties may be advantageous for various types of clear coatings, colored coatings, primer coatings, static dissipative coatings and printed electronics, batteries, capacitors, electric traces, antennas, electrical heating coatings and the like.

SUMMARY OF THE INVENTION

An aspect of the invention provides an electrically conductive coating composition comprising a film-forming resin and thermally produced graphenic carbon particles. When the coating composition is cured it has an electrical conductivity greater than an electrical conductivity of the same coating composition without the thermally produced graphenic carbon particles.

Another aspect of the invention provides an electrically conductive coating comprising a polymeric resin film and thermally produced graphenic carbon particles dispersed in the polymeric resin film.

A further aspect of the invention provides a method of making an electrically conductive coating composition comprising mixing thermally produced graphenic carbon particles with a film-forming resin.

DETAILED DESCRIPTION OF EMBODIMENTS OF THE INVENTION

In accordance with embodiments of the present invention, graphenic carbon particles are added to coating compositions to provide desirable properties such as increased electrical conductivity. As used herein, the term "electrically conductive", when referring to a coating containing graphenic carbon particles, means that the coating has an electrical conductivity of at least 0.001 S/m. For example, the coating may have a conductivity of at least 0.01, or at least 10 S/m. Typically the conductivity may be from 100 to 100,000 S/m, or higher. In certain embodiments, the conductivity may be at least 1,000 S/m or at least 10,000 S/m. For example, the conductivity may be at least 20,000 S/m, or at least 30,000 S/m, or at least 40,000 S/m.

In accordance with certain embodiments, the coatings do not exhibit significant electrical conductivity absent the addition of graphenic carbon particles. For example, a conventional refinish clearcoat may have a conductivity that is not measureable, while coatings of the present invention including graphenic carbon particles may exhibit conductivities as noted above. In certain embodiments, the addition of graphenic carbon particles increases conductivity of the coatings by greater than a factor of 10, typically greater than a factor of 1,000 or 100,000 or higher.

In certain embodiments, the graphenic carbon particles may be added to film-forming resins in amounts of from 0.1 to 95 weight percent based on the total coating solids. For example, the graphenic carbon particles may comprise from 1 to 90 weight percent, or from 5 to 85 weight percent. In certain embodiments, the amount of graphenic carbon particles contained in the coatings may be relatively large, such as from 40 or 50 weight percent up to 90 or 95 weight percent. For example, the graphenic carbon particles may comprise from 60 to 85 weight percent, or from 70 to 80 weight percent. In certain embodiments, conductivity properties of the coatings may be significantly increased with relatively minor additions of the graphenic carbon particles, for example, less than 50 weight percent, or less than 30 weight percent. In certain embodiments, the present coatings have sufficiently high electrical conductivities at relatively low loadings of the graphenic carbon particles. For example, the above-noted electrical conductivities may be achieved at graphenic carbon particle loadings of less than 20 or 15 weight percent. In certain embodiments, the particle loadings may be less than 10 or 8 weight percent, or less than 6 or 5 weight percent. For example, for coatings comprising film-forming polymers or resins that by themselves are non-conductive, the addition of from 3 to 5 weight percent of thermally produced graphenic carbon particles may provide an electrical conductivity of at least 0.1 S/m, e.g., or at least 10 S/m.

The coating compositions can comprise any of a variety of thermoplastic and/or thermosetting compositions known in the art. For example, the coating compositions can comprise film-forming resins selected from epoxy resins, acrylic polymers, polyester polymers, polyurethane polymers, polyamide polymers, polyether polymers, bisphenol A based epoxy polymers, polysiloxane polymers, styrenes, ethylenes, butylenes, copolymers thereof, and mixtures thereof. Generally, these polymers can be any polymers of these types made by any method known to those skilled in the art. Such polymers may be solvent borne, water soluble or water dispersible, emulsifiable, or of limited water solubility. Furthermore, the polymers may be provided in sol gel systems, may be provided in core-shell polymer systems, or may be provided in powder form. In certain embodiments, the polymers are dispersions in a continuous phase comprising water and/or organic solvent, for example emulsion polymers or non-aqueous dispersions.

Thermosetting or curable coating compositions typically comprise film forming polymers or resins having functional groups that are reactive with either themselves or a cross-linking agent. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, styrenic groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates. Examples of commercially available polyisocyanates include DESMODUR N3390, which is sold by Bayer Corporation, and TOLONATE HDT90, which is sold by Rhodia Inc. Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein. In certain embodiments, the resin can be self crosslinking Self crosslinking means that the resin contains functional groups that are capable of reacting with themselves, such as alkoxysilane groups, or that the reaction product contains functional groups that are coreactive, for example hydroxyl groups and blocked isocyanate groups.

The dry film thickness of the cured coatings may typically range from less than 0.5 microns to 100 microns or more, for example, from 1 to 50 microns. As a particular example, the cured coating thickness may range from 1 to 15 microns.

In accordance with certain embodiments, when the coating compositions are cured, the resultant coatings comprise a continuous matrix of the cured resin with graphenic carbon particles dispersed therein. The graphenic carbon particles may be dispersed uniformly throughout the thickness of the coating. Alternatively, the graphenic carbon particles may be distributed non-uniformly, e.g., with a particle distribution gradient through the thickness of the coating and/or across the coating.

As used herein, the term "graphenic carbon particles" means carbon particles having structures comprising one or more layers of one-atom-thick planar sheets of $sp^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The graphenic carbon particles may be substantially flat, however, at least a portion of the planar sheets may be substantially curved, curled, creased or buckled. The particles typically do not have a spheroidal or equiaxed morphology.

In certain embodiments, the graphenic carbon particles present in the coating compositions of the present invention have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. In certain embodiments, the graphenic carbon particles may be from 1 atom layer up to 3, 6, 9, 12, 20 or 30 atom layers thick, or more. In certain embodiments, the graphenic carbon particles present in the compositions of the present invention have average particle sizes, i.e., widths and lengths, measured in a direction parallel to the carbon atoms layers, of at least 10 or 30 nanometers, such as more than 50 nanometers, in some cases more than 100 nanometers up to 1,000 nanometers. For example, the average particle size of the graphenic carbon particles may be from 200 to 800 nm, or from 250 to 750 nm. The graphenic carbon particles may be provided in the form of ultrathin flakes, platelets or sheets having relatively high average aspect ratios (aspect ratio being defined as the ratio of the longest dimension of a particle to the shortest dimension of the particle) of greater than 3:1, such as greater than 10:1 up to 2000:1. For example, the aspect ratios may be greater than 15:1, or greater than 25:1, or greater than 100:1, or greater than 500:1.

In certain embodiments, the graphenic carbon particles used in the coating compositions of the present invention have relatively low oxygen content. For example, the graphenic carbon particles used in certain embodiments of the compositions of the present invention may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

In certain embodiments, the graphenic carbon particles used in the coating compositions of the present invention have a B.E.T. specific surface area of at least 50 square meters per gram, such as at least 70 square meters per gram, or, in some cases, at least 100 square meters per grams. For example, the surface area may be from 100 or 150 to 500 or 1,000 square meters per gram, or from 150 to 300 or 400 square meters per gram. In certain embodiments, the surface area is less than 300 square meters per gram, for example, less than 250 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

In certain embodiments, the graphenic carbon particles used in the coating compositions of the present invention have a Raman spectroscopy 2D/G peak ratio of at least 1.1, for example, at least 1.2 or 1.3. As used herein, the term "2D/G peak ratio" refers to the ratio of the intensity of the 2D peak at 2692 $cm^{-1}$ to the intensity of the G peak at 1,580 $cm^{-1}$.

In certain embodiments, the graphenic carbon particles used in the coating compositions of the present invention have a relatively low bulk density. For example, the graphenic carbon particles used in certain embodiments of the present invention are characterized by having a bulk density (tap density) of less than 0.2 g/cm$^3$, such as no more than 0.1 g/cm$^3$. For the purposes of the present invention, the bulk density of the graphenic carbon particles is determined by placing 0.4 grams of the graphenic carbon particles in a glass measuring cylinder having a readable scale. The cylinder is raised approximately one-inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of g/cm$^3$.

In certain embodiments, the graphenic carbon particles used in the coating compositions of the present invention have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40 percent, such as less than 30 percent, such as from 25 to 30 percent.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density (g/cm}^3\text{)} = \frac{0.1 \text{ grams}}{\pi * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 g/cm$^3$, which is the density of graphite.

In certain embodiments, the graphenic carbon particles have a measured bulk liquid conductivity of at least 10 microSiemens, such as at least 30 microSiemens, such as at least 100 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

In accordance with certain embodiments, percolation, defined as long range interconnectivity, occurs between the conductive graphenic carbon particles. Such percolation may reduce the resistivity of the coating compositions. The conductive graphenic particles may occupy a minimum volume within the coating such that the particles form a continuous, or nearly continuous, network. In such a case, the aspect ratios of the graphenic carbon particles may affect the minimum volume required for percolation. Furthermore, the surface energy of the graphenic carbon particles may be the same or similar to the surface energy of the elastomeric rubber. Otherwise, the particles may tend to flocculate or demix as they are processed.

The thermally produced graphenic carbon particles utilized in the coating compositions of the present invention are made by thermal processes. In accordance with embodiments of the invention, thermally-produced graphenic carbon particles are made from carbon-containing precursor materials that are heated to high temperatures in a thermal zone such as a plasma. As more fully described below, the carbon-containing precursor materials are heated to a sufficiently high temperature, e.g., above 3,500° C., to produce graphenic carbon particles having characteristics as described above. The carbon-containing precursor, such as a hydrocarbon provided in gaseous or liquid form, is heated in the thermal zone to produce the graphenic carbon particles in the thermal zone or downstream therefrom. For example, thermally-produced graphenic carbon particles may be made by the systems and methods disclosed in U.S. Pat. Nos. 8,486,363 and 8,486,364.

In certain embodiments, the thermally produced graphenic carbon particles may be made by using the apparatus and method described in U.S. Pat. No. 8,486,363 at [0022] to [0048] in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to a temperature of at least 1,000° C. to form the graphenic carbon particles. In other embodiments, the thermally produced graphenic carbon particles may be made by using the apparatus and method described in U.S. Pat. No. 8,486,364 at [0015] to [0042] in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system. In certain embodiments, the precursor material is heated to a temperature of at least 3,500° C., for example, from a temperature of greater than 3,500° C. or 4,000° C. up to 10,000° C. or 20,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

Without being bound by any theory, it is currently believed that the foregoing methods of manufacturing thermally produced graphenic carbon particles are particularly suitable for producing graphenic carbon particles having relatively low thickness and relatively high aspect ratio in combination with relatively low oxygen content, as described above. Moreover, such methods are currently believed to produce a substantial amount of graphenic carbon particles having a substantially curved, curled, creased or buckled morphology (referred to herein as a "3D" morphology), as opposed to producing predominantly particles having a substantially two-dimensional (or flat) morphology. This characteristic is believed to be reflected in the previously described compressed density characteristics and is believed to be beneficial in the present invention because, it is currently believed, when a significant portion of the graphenic carbon particles have a 3D morphology, "edge to edge" and "edge-to-face" contact between graphenic carbon particles within the composition may be promoted. This is thought to be because particles having a 3D morphology are less likely to be aggregated in the composition (due to lower Van der Waals forces) than particles having a two-dimensional morphology. Moreover, it is currently believed that even in the case of "face to face" contact between the particles having a 3D morphology, since the particles may have more than one facial plane, the entire particle surface is not engaged in a single "face to face" interaction with another single particle, but instead can participate in interactions with other particles, including other "face to face" interactions, in other planes. As a result, graphenic carbon particles having a 3D morphology are currently thought to provide the best conductive pathway in the present compositions and are currently thought to be useful for obtaining electrical conductivity characteristics sought by embodiments of the present invention, particularly when the graphenic carbon particles are present in the composition in relatively low amounts.

In certain embodiments, the thermally produced graphenic carbon particles may be combined with other types of graphenic particles, such as those obtained from commercial sources, for example, from Angstron, XG Sciences and other commercial sources. In such embodiments, the commercially available graphenic carbon particles may comprise exfoliated graphite and have different characteristics in comparison with the thermally produced graphenic carbon particles, such as different size distributions, thicknesses, aspect ratios, structural morphologies, oxygen content, and chemical functionality at the basal planes/edges.

When thermally produced graphenic carbon particles are combined with commercially available graphenic carbon particles in accordance with embodiments of the invention, a bi-modal distribution, tri-modal distribution, etc. of graphenic carbon particle characteristics may be achieved. For example, the graphenic carbon particles contained in the coatings may have multi-modal particle size distributions, aspect ratio distributions, structural morphologies, edge functionality differences, oxygen content, and the like. The following Table 1 lists average particle sizes, thicknesses and aspect ratios for thermally produced graphenic carbon particles in comparison with certain commercially available graphenic carbon particles produced from exfoliated graphite.

In an embodiment of the present invention in which both thermally produced graphenic carbon particles and commercially available graphenic carbon particles, e.g., from exfoliated graphite, are added to a coating composition to produce a bi-modal graphenic particle size distribution, the relative amounts of the different types of graphenic carbon particles are controlled to produce desired conductivity properties of the coatings. For example, the thermally produced graphenic particles may comprise from 1 to 50 weight percent, and the commercially available graphenic carbon particles may comprise from 50 to 99 weight percent, based on the total weight of the graphenic carbon particles. In certain embodiments, the thermally produced graphenic carbon particles may comprise from 2 to 20 weight percent, or from 5 to 10 or 12 weight percent.

In addition to the resin and graphenic carbon particle components, the coatings of the present invention may include additional components conventionally added to coating compositions, such as cross-linkers, pigments, tints, flow aids, defoamers, dispersants, solvents, UV absorbers, catalysts and surface active agents.

In certain embodiments, the coating compositions are substantially free of certain components such as polyalkyleneimines, graphite, or other components. For example, the term "substantially free of polyalkyleneimines" means that polyalkyleneimines are not purposefully added, or are present as impurities or in trace amounts, e.g., less than 1 weight percent or less than 0.1 weight percent. Coatings of the present invention have been found to have good adhesion properties without the necessity of adding polyalkyleneimines. The term "substantially free of graphite" means that graphite is not purposefully added, or is present as an impurity or in trace amounts, e.g., less than 1 weight percent or less than 0.1 weight percent. In certain embodiments, graphite in minor amounts may be present in the coatings, e.g., less than 5 weight percent or less than 1 weight percent of the coating. If graphite is present, it is typically in an amount less than the graphene, e.g., less than 30 weight percent based on the combined weight of the graphite and graphene, for example, less than 20 or 10 weight percent.

The coating compositions of the present invention may be made by various standard methods in which the graphenic carbon particles are mixed with the film-forming resins and other components of the coating compositions. For example, for two-part coating systems, the graphenic carbon particles may be dispersed into part A and/or part B. In certain embodiments, the graphenic carbon particles are dispersed into part A by various mixing techniques such as sonication, high speed mixing, media milling and the like. In certain embodiments, the graphenic carbon particles may be mixed into the coating compositions using high-energy and/or high-shear techniques such as sonication, 3-roll milling, ball milling, attritor milling, rotor/stator mixers, and the like.

In accordance with certain embodiments, the coatings of the present invention possess desirable mechanical properties, increased IR absorption, increased "jetness", increased thermal conductivity, decreased permeability to small molecules like water and oxygen may also be advantageous to these same coatings.

The following examples are intended to illustrate various aspects of the invention, and are not intended to limit the scope of the invention.

EXAMPLE 1

The electrical conductivities of coatings containing thermally produced graphenic carbon particles were compared with similar coatings containing commercial graphene particles, and no such particles. The coating compositions were made with aqueous latex particles that are stable in N-methyl pyrrolidone (NMP) solvent. The acrylic latex particles are crosslinked and are epoxy functionalized, but need not be functionalized to work. The latex forms a film at elevated temperatures and serves as the binder to hold the film together. Thermally produced graphenic carbon particles, labeled PPG A and PPG B, were produced by the thermal plasma production method utilizing methane as a precursor material disclosed in U.S. Pat. No. 8,486,364. The thermally produced PPG A and PPG B graphenic carbon particles have a surface area of about 250-280 m$^2$/g and are about 100-200 nm in size. The commercially available graphenic carbon particles included: XG-M5 (from XG Sciences having an average particle size of 5 microns, thickness of about 6 nm, and BET surface area of from 120 to 150 square meters per gram); XG-C750 (from XG Sciences having an average particle size of about 1.5 micron, thickness of about 2 nm, and BET surface area of 750 square meters per gram); and PDR (from Angstron Materials having an average particle size of about 10 microns, thickness of about 1 nm and BET surface area of from 400 to 800 square meters per gram). Prior to the addition of the graphenic carbon particles to the coating solution, samples are diluted to 0.25-2.5 weight percent in NMP solvent and horn sonicated for 15 min. The PPG B sample was dispersed with double the sonication energy per unit graphene in comparison with the PPG A sample. The final coating composition is then made by mixing latex, NMP solvent, and the pre-dispersed graphenic carbon particles. Samples are then bath sonicated for 15 minutes. Following sonication, samples are passed through a 150 mesh filter and then drawn down on glass substrates at a 6 mil wet film build. The wet films are flashed at room temperature for 15 minutes, followed by an oven cure at 100° C. for 30 minutes.

Figure 1:
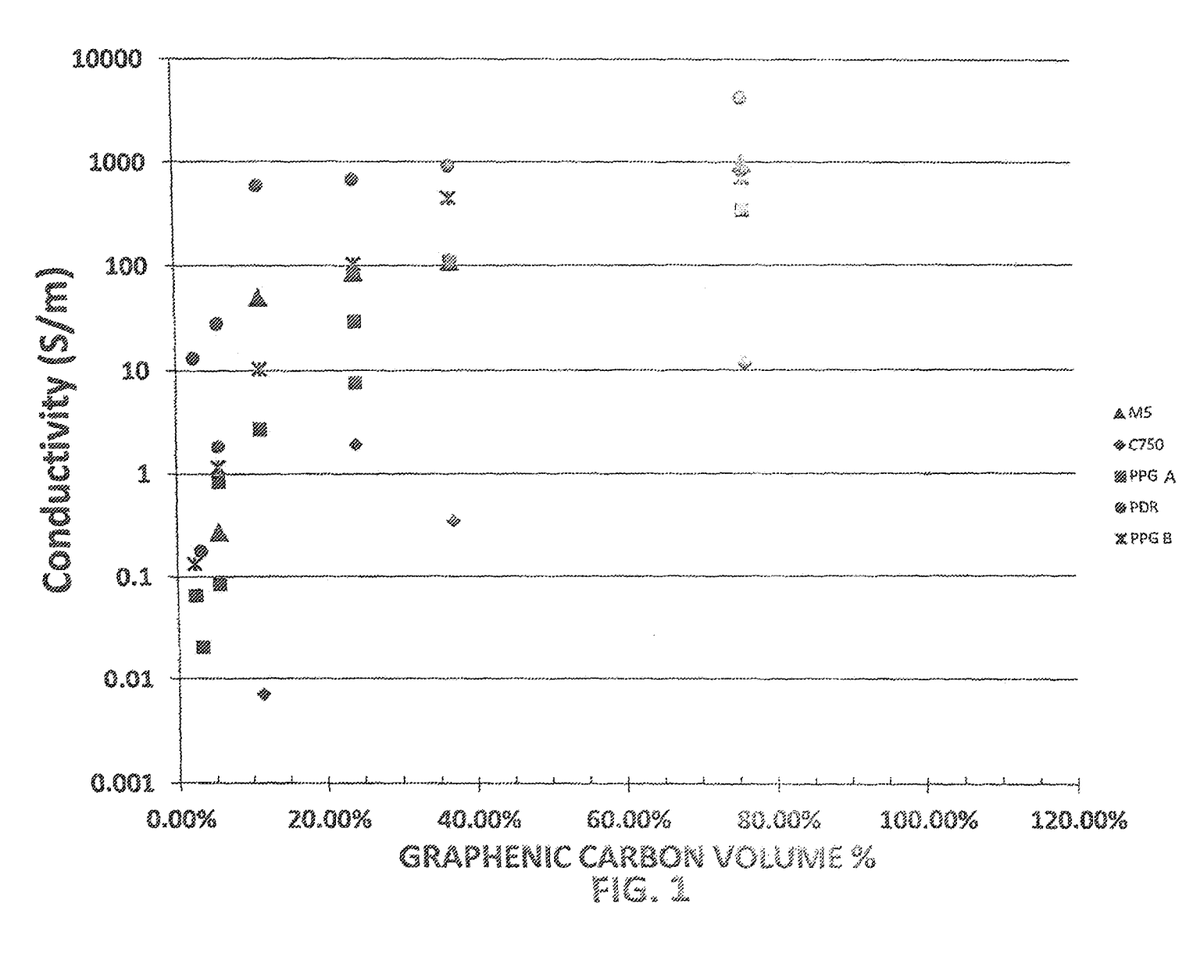
FIG. 1 is a graph illustrating electrical conductivity properties of various coatings containing thermally-produced graphenic carbon particles in accordance with embodiments of the present invention in comparison with coatings containing other types of commercial graphene particles.

FIG. 1 graphically illustrates the conductivities of the coatings containing the thermally produced PPG A and PPG B graphenic carbon particles at various loadings, in comparison with the other commercial graphenic carbon particles and a control coating containing no such particles, which measured no conductivity. Although the PPG A and PPG B particles are about an order of magnitude smaller than the M5 particles, they produce similar electrical conductivities. As the particles get smaller, the resistance should increase in the film at a similar loading, i.e., comparing the M5 with PDR, which is a ~10 micron average particle size vs. 5 micron and the C750 which is 1.5 microns. However, the thermally produced graphene particles provide a lower resistance coating. This may be due to the extremely low oxygen content of the thermally produced graphenic carbon particles and the fact that their edge functionality may be limited to C—H bonds vs. C—O, C—N, bonds observed in commercial graphene samples, producing a lower particle-particle contact resistance for the thermally produced graphene. The thermally produced graphene may also be inherently more conductive because of its turbostratic crystal structure.

EXAMPLE 2

Coatings comprising one type of commercially available graphenic carbon particles alone, and in combination with other graphenic carbon particles (including thermally produced graphenic carbon particles), were produced and measured for electrical conductivity. The coating compositions were made with 10 weight percent graphenic carbon particles: either xGnP C-300 (from XG Sciences having an average particle size of 1.5 micron, thickness of about 2 nm, and BET surface area of 300 square meters per gram), xGnP C-750 (from XG Sciences as described in Example 1), xGnP M-25 (from XG Sciences having an average particle size of 25 microns, thickness of 6-8 nm, and BET surface area of 120-150 square meters per gram), or PPG thermally produced graphenic carbon particles, with 1.67 weight percent ethyl cellulose (Aqualon, Ashland), and with 88.33 weight percent deionized water. These coating compositions were dispersed by adding 70 g of each into 8 ounce glass jars with 220 g of SEPR Ermil 1.0-1.25 mm milling media. The samples in the jars were shaken for 4 hours using a Lau disperser (Model DAS 200, Lau, GmbH). The milling media was then filtered off from the coating compositions. Mixtures of these coating compositions were then prepared, such that of the total 10 percent by weight of graphenic carbon in each of the mixtures, there were two types of graphenic carbon particles in the following weight percentages: 92% xGnP M-25 and 8% PPG thermally produced graphenic carbon particles, 92% xGnP M-25 and 8% xGnP C-300, and 92% xGnP M-25 and 8% xGnP C-750. Each of these mixtures as well as the coating composition with only xGnP M-25 were applied as 1-2 mm wide lines in a serpentine circuit pattern to a 2×3 inch glass slide (Fisherbrand, Plain, Precleaned) using a dispensing jet (PICO valve, MV-100, Nordson, EFD) and a desktop robot (2504N, Janome) and then dried in an oven at 212° F. for 30 minutes. Electrical conductivity of each coated sample was determined by first measuring the resistance of the serpentine circuit vs. the length of the circuit line. Then, the cross-sectional area of the serpentine lines was measured using a stylus profilometer (Dektak). Using the measured values for the cross sectional area (A) and the resistance (R) for a given length (L) of the circuit, the resistivity ($\rho$) was calculated using the equation $\rho=RA/L$. Then the conductivity ($\sigma$) was calculated by taking the reciprocal of the resistivity, $\sigma=1/\rho$.

Figure 2:
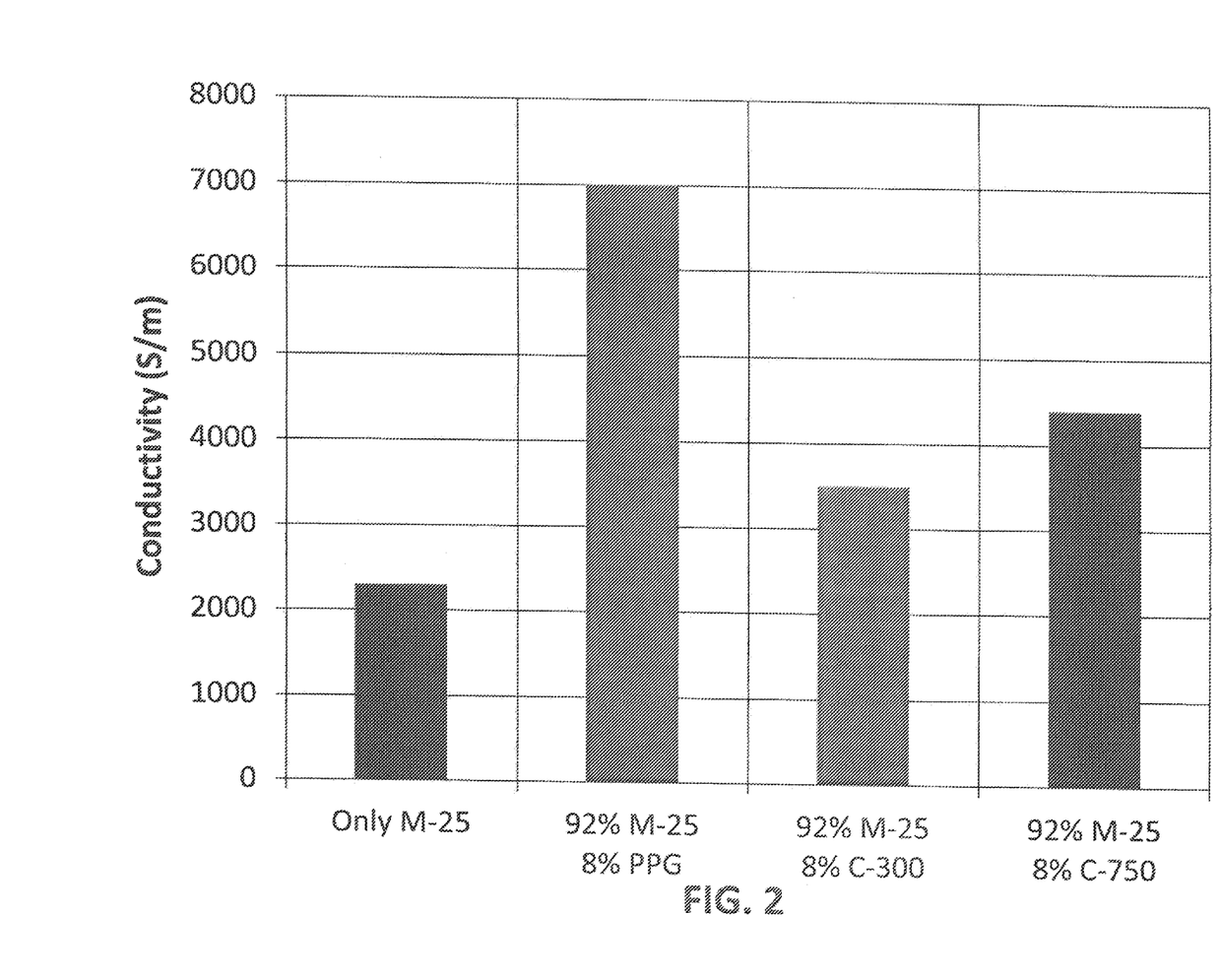
FIG. 2 is a graph illustrating electrical conductivity properties of various coatings containing one type of commercially available graphenic carbon particles in combination with either thermally-produced graphenic carbon particles of the present invention or other types of commercially available graphenic carbon particles.

The results are shown in FIG. 2. The addition of a small amount of PPG thermally produced graphenic carbon particles significantly increases the conductivity, by about 200%, above that of a coating composition containing only a large-platelet type graphenic carbon (xGnP M-25). FIG. 2 shows that small additions of other commercially available graphenic carbon particles did not increase the conductivity as significantly (only about 50% increase for xGnP C-300 and only about 90% increase for xGnP C-750).

For purposes of this description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

We claim:

1. An electrically conductive coating composition comprising:
   a film-forming resin; and
   thermally produced graphenic carbon particles produced by heating a precursor material comprising a methane or a hydrocarbon material capable of forming a two-carbon-fragment species in a thermal zone having a temperature of greater than 3,500° C. to form the graphenic carbon particles from the precursor material, wherein the thermally produced graphenic carbon particles comprise 3 or more carbon atom layers, have an average aspect ratio of greater than 3:1, a B.E.T. specific surface area of at least 50 square meters per gram, and a Raman spectroscopy 2D/G peak ratio of at least 1.1:1, and wherein when the coating composition is cured it has an electrical conductivity greater than an electrical conductivity of the same coating composition without the thermally produced graphenic carbon particles.

2. The electrically conductive coating composition of claim 1, wherein the thermally produced graphenic carbon particles comprise from 1 to 95 weight percent of the coating composition based on the total solids content of the coating composition.

3. The electrically conductive coating composition of claim 1, wherein the thermally produced graphenic carbon particles comprise greater than 40 weight percent of the coating composition based on the total solids content of the coating composition.

4. The electrically conductive coating composition of claim 1, wherein the thermally produced graphenic carbon particles comprise less than 20 weight percent of the coating composition based on the total solids content of the coating composition.

5. The electrically conductive coating composition of claim 1, wherein the thermally produced graphenic carbon particles have an oxygen content of less than 1.5 atomic percent.

6. The electrically conductive coating composition of claim 1, wherein the thermally produced graphenic carbon particles have a BET surface area of less than 300 square meters per gram.

7. The electrically conductive coating composition of claim 1, further comprising exfoliated graphite graphenic carbon particles.

8. The electrically conductive coating composition of claim 7, wherein the thermally produced graphenic carbon particles comprise from 1 to 20 weight percent, and the exfoliated graphite graphenic carbon particles comprise from 80 to 99 weight percent, based on the total weight of the graphenic carbon particles.

9. The electrically conductive coating composition of claim 1, wherein the film-forming resin is selected from the group consisting of epoxy resins, acrylic polymers, polyester polymers, polyurethane polymers, polyamide polymers, polyether polymers, bisphenol A based epoxy polymers, polysiloxane polymers, styrenes, ethylenes, butylenes, core-shell polymers, non-aqueous dispersed polymer particles, copolymers thereof, or mixtures thereof.

10. The electrically conductive coating composition of claim 1, wherein the film-forming comprises a latex resin or a non-aqueous dispersed resin.

11. The electrically conductive coating of claim 1, wherein the coating is substantially free of graphite.

12. The electrically conductive coating of claim 1, wherein the coating is substantially free of polyalkyleneimines.

13. The electrically conductive coating composition of claim 1, wherein the electrical conductivity of the cured coating composition is at least 1,000 S/m.

14. The electrically conductive coating composition of claim 12, wherein the electrical conductivity of the cured coating composition is at least 10,000 S/m.

15. An electrically conductive coating comprising:
   a polymeric resin film; and
   thermally produced graphenic carbon particles dispersed in the polymeric resin film produced by heating a precursor material comprising a methane or a hydrocarbon material capable of forming a two-carbon-fragment species in a thermal zone having a temperature of greater than 3,500° C. to form the graphenic carbon particles from the precursor material, wherein the thermally produced graphenic carbon particles comprise 3 or more carbon atom layers, have an average aspect ratio of greater than 3:1, a B.E.T. specific surface area of at least 50 square meters per gram, and a Raman spectroscopy 2D/G peak ratio of at least 1.1:1.

16. The electrically conductive coating of claim 15, wherein the electrically conductive coating has an electrical conductivity of at least 10 S/m.

17. The electrically conductive coating of claim 15, wherein the electrically conductive coating has an electrical conductivity of at least 1,000 S/m.

18. The electrically conductive coating of claim 15, wherein the electrically conductive coating has an electrical conductivity of at least 10,000 S/m.

19. The electrically conductive coating of claim 15, further comprising exfoliated graphite graphenic carbon particles dispersed in the polymeric film.

20. The electrically conductive coating of claim 15, wherein the polymeric resin is selected from the group consisting of epoxy resins, acrylic polymers, polyester polymers, polyurethane polymers, polyamide polymers, polyether polymers, bisphenol A based epoxy polymers, polysiloxane polymers, styrenes, ethylenes, butylenes, core-shell polymers, non-aqueous dispersed polymer particles, copolymers thereof, or mixtures thereof.

21. The electrically conductive coating of claim 15, wherein the coating has a dry film thickness of from 1 to 100 microns.

22. A method of making an electrically conductive coating composition comprising mixing thermally produced graphenic carbon particles with a film-forming resin to produce the electrically conducting coating composition of claim 1.

\* \* \* \* \*